Jan. 18, 1955     H. O. DARNELL     2,699,601
POSITIONING MEANS FOR FABRICATION OF JOINTED CAULKED PIPE
Filed March 13, 1950
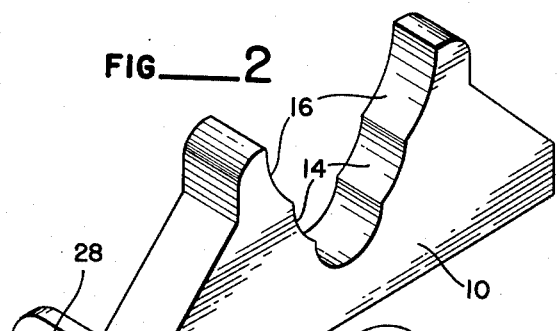
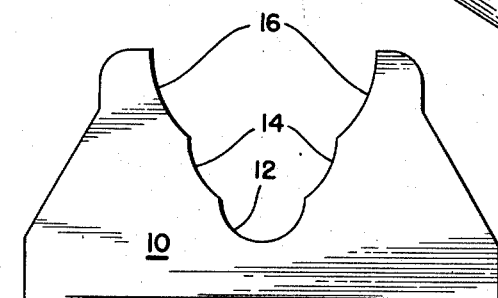
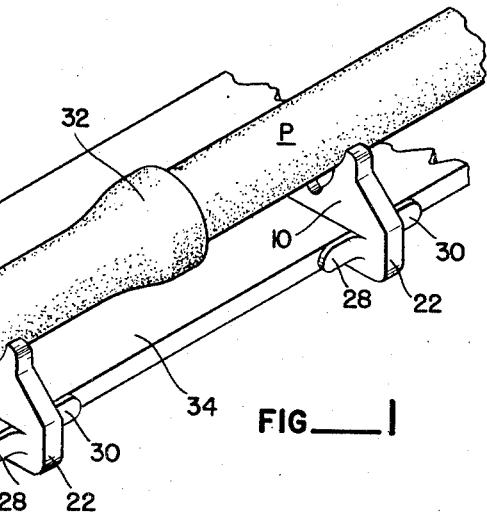
HOWARD O. DARNELL
Inventor
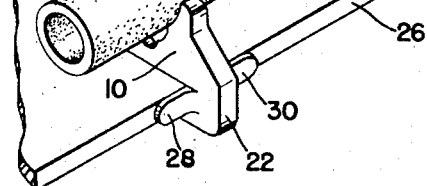
Attorneys

United States Patent Office 2,699,601
Patented Jan. 18, 1955

2,699,601

POSITIONING MEANS FOR FABRICATION OF JOINTED CAULKED PIPE

Howard O. Darnell, Seattle, Wash.

Application March 13, 1950, Serial No. 149,430

2 Claims. (Cl. 29—287)

This present invention consists of a plurality of rest or support members which are axially aligned on a work bench or plank and when so positioned provide a convenient means for holding joints of pipe in an aligned position so that caulking the joints of the same can be achieved with ease and certainty. To add to the general usefulness of the device, as a whole, the individual rest members are fashioned so as to be able to accommodate several different sizes of pipe.

Much sewer pipe and water pipe is made of cast iron sections, which are belled at one end for the reception of an abutting pipe, and the space around the end of the second pipe and inside the bell of the first pipe is caulked with lead, normally. In the past it has been common to put the pipe in place and to then caulk the joints. However, this method has proved to be a tedious, time-consuming operation. Too often the joints are difficult of access due to framing of buildings or if the same are laid in a trench the caulking must be done in restricted quarters and one portion of the joint is normally hidden from view so that the certainty of having a completely caulked joint is always in doubt.

Through the use of this present equipment it is now possible to fabricate relatively large sections of such jointed pipe and produce, in effect, a single, long, fully caulked tube. By using a plurality of the rest members contemplated by this invention and having the members in axial alignment the workman is doing his work under most favorable conditions, where it is convenient. He is not crowded and he can revolve the work from time to time so as to make it most convenient for him and further it gives him an opportunity to fully inspect the full length of his annular caulked joint.

The principal object of this present invention therefore is to provide means whereby a plurality of cast-iron pipe sections can be held in axial alignment and the caulking done while the sections are thus positioned so that a long stretch of fully caulked tubing can be produced.

A further object of this invention is to provide means whereby the caulking of the annular joints of belled pipe can be achieved in the full view of the workman and under conditions propitious to maximum efficiency.

A further object of this invention is to provide means for aligning a plurality of pipe sections and to be able to rotate them as the caulking operation proceeds so that the entire joint can be fully inspected at its completion.

A further object of this invention is to provide in a simple, economical, easy-to-transport form means for aligning a plurality of pipe sections.

A further object of this invention is to provide that each of the rest elements is provided with means which will quickly adapt them to clamping on to the edge of a plank or work bench so that with the minimum of attention from the workman a plurality of such rest members can be accurately aligned and clamped in working position.

Further objects, advantages and capabilities will be apparent from the description and disclosure in the drawings, or may be comprehended or are inherent in the device.

In the drawings:

Figure 1 is a perspective view showing the manner in which this invention is employed;

Figure 2 is a perspective view showing one of the individual rest units forming part of this equipment;

Figure 3 is a side elevation of the rest unit of Figure 2.

Referring more particularly to the disclosure in the drawings, the numeral 10 designates the body portion proper of a rest unit made after the teachings of this invention. This member is preferably formed of metal which may be fabricated in any preferred manner. A very satisfactory construction is to cast these units of some of the lighter metal alloys so that they will be light to carry about and still be sufficiently rigid to serve their intended purpose. Satisfactory units of this order have been burned out of plate stock with certain portions welded thereto and reinforced in parts to give the required thickness of metal. In the preferred embodiment of this invention the body portion is formed with a rest portion having a general V shape. However, it has been found best to employ, instead of a straight V, a configured V form in which parts of a circumference of a circle are employed to the end that the short sections of pipe can be more adequately supported. In the form shown in the drawings the lower portion which is just slightly less than a semi-circle and is indicated at 12 is of a size to form a snug, but not a tight fit, say on a two inch pipe. Immediately above this are two co-acting arcs as 14 which represent the circle of a next sized larger pipe, as for example, a three inch pipe. Disposed next above arcs 14 are two other co-acting arcs 16 which again are part of a circle such as will give a workable fit with the next size larger pipe for instance a four inch pipe. In each instance it has been found desirable that the bottom semi-circle and the arcs 14 and 16 should not come quite up to a horizontal diameter for the various sizes. This is in the interest of providing an ample rest but one where there will be no difficulty in entering the pipe and little danger of the same becoming wedged into the rest portion. In all references the exact diameters used must be sufficient so that the outside diameter of the pipe will be somewhat exceeded and thus accommodate any rough surfaces such as is very common in cast-iron pipes. Any reasonable number of pipe sizes could be accommodated by a single body 10. However, experience has proven that a limit of three is probably most satisfactory in that it keeps the unit relatively small and where it is necessary to employ much larger sizes then larger and heavier as well as bulkier units can be used, designed primarily for those larger sizes.

Disposed immediately below body 10 and spaced therefrom in parallel relationship is the clamping arm 18. It has been found most convenient normally to have the thickness of this member the same as that of body 10 and to have its vertical extent or depth adequate so that even though considerable pressure is applied to the clamp screw 20 it will not appreciably spring this arm. Arm 18 is connected to body 10 by a web portion 22 which normally should have a greater cross section than arm 18 as considerable strength is required of this member. This relationship is desirable in that arm 18 out to the point of screw 20 provides considerable leverage and if web 22 is not of adequate strength bending will occur at this point.

A locking screw 20 is provided in the same plane with the centers from which arcs 12, 14 and 16 are struck. This relationship is not essential but it has been found of considerable convenience in the alignment of a plurality of these rest members. Screw 20, which is threaded into arm 18 and acts as a set screw, is provided with a turning bar 24 which would normally be limited in extent so that excessive pressure cannot be applied to screw 20 and thus possibly deform arm 18. These proportions are normally quite well established in mechanical design and have ben determined by experience and are generally used to the end that deformation of the associated parts will not be occasioned by improper application of effort.

It has been found that for all practical purposes adequate alignment of the various rest members can be achieved by fitting the same to a plank or bench top having a frontal edge that is straight. It then becomes necessary that the various rest members are disposed at right angle to this frontal edge or face and to this end orienting or positioning lugs 28 and 30 are formed as lateral extensions of body 10. These two members when viewed as in Figure 3 should form a single plane and this plane at right angles to the vertical plane of body 10. When so positioned it is believed it will be apparent that when a plurality of these units are employed, as is illustrated in Figure 1, that little skill will be required to accurately position the various rest members so that the pipe receiving arcs will be axially aligned.

Method of use

In using this present invention it is customary to lay a number of lengths of pipe as P along the table top or single plank, if only one is used, and with the small ends of adjacent pipes seated in the bell portions 32 in about their final position. When the pipe is thus laid out it gives an immediate indication of the most effective placement of the various rest members. Considerable experience with these devices indicated that a preferred arrangement is to use two rest members for each length of pipe. This thus provides each section of pipe with a fixed axial position and permits the pipe to be rolled over without any buckling or displacement of a partially caulked joint. This rolling over of the pipe in the rest is a very important factor in the proper use of this equipment as it provides that the work is always in the most favorable position for the workman. It also insures that by turning the caulked sections entirely around their axis that a very convenient means is provided for a thorough inspection of the joint to determine that it is adequate. In the smaller sizes it has been found quite convenient to use a single plank as 34 as a base for securing the various rest members in position and this same unit can, in many cases, be very properly used as a means of carrying the assembled pipe to the place of use or for merely tipping the same over if the pipe is used in a trench for instance.

It is believed that it will be clearly apparent from the above description and the disclosure in the drawings that the invention comprehends a novel construction of positioning means for the fabrication of jointed caulked pipe.

Having thus disclosed the invention, I claim:

1. Positioning means for fabrication of jointed caulked pipe such as sewer pipe, comprising: a portable plank having a longitudinal straight side edge, a series of rest units mounted on said plank along said straight edge spaced apart one from another and including a pair of rest units positioned to support each of a plurality of pipe sections; each rest unit having a body portion having an upwardly directed rest generally V-shaped in a plane at right angles to said straight edge, the walls of each rest being formed as segments of circumferences of a plurality of circles, the base supporting surface of each rest being slightly less than a hemi-circle and the opposed sides of each rest above said base together forming a plurality of supporting surfaces each slightly less than the lower half of an upright circle with an arc at its base removed, said supporting surfaces being of increasing diameters from the bottom to the top of said rest; each rest unit having a clamping arm portion under said body portion disposed below said plank parallel to and spaced from the lower edge of said body portion; each rest unit having a web portion connecting the arm portion and the body portion and extending across the straight edge; each rest unit having a lug on each side of said web portion extending at right angles to said body portion and abutting said straight edge to orient the body portion relative the straight edge; and each rest unit having a threaded clamping member positioned in said arm portion pressing on the bottom of said plank and clamping said plank to said body portion.

2. Positioning means for fabrication of jointed caulked pipe such as sewer pipe, comprising: a supporting member including a board-like member having a longitudinal straight side edge, a series of at least three rest units mounted on said board-like member along said straight edge spaced apart one from another disposed to support a plurality of pipe sections; each rest unit having a body portion having an upwardly directed rest generally V-shaped in a plane at right angles to said straight edge, the opposing walls of each rest being formed with a plurality of concave portions, said concave portions on opposite walls being aligned on the same levels and the concave portions on each level being formed substantially as arcs of the same circle whereby a pipe having approximately the same diameter is closely supported by the rest; each rest unit having a clamping arm portion under said body portion disposed below said board-like member; each rest unit having a web portion connecting the arm portion and the body portion and extending across the straight edge; each rest unit having a lug on each side of said web portion extending at right angles to said body portion and abutting said straight edge to orient the body portion relative the straight edge; and each rest unit having a threaded clamping member positioned in said arm portion pressing on the bottom of said board-like member and clamping it to said body portion.

References Cited in the file of this patent

UNITED STATES PATENTS

| Number | Name | Date |
|---|---|---|
| 285,328 | Wenigmann | Sept. 18, 1883 |
| 361,276 | MacFarlane | Apr. 19, 1887 |
| 1,211,527 | Berndt | Jan. 9, 1917 |
| 1,350,119 | Staley | Aug. 17, 1920 |
| 2,421,296 | Solomon | May 27, 1947 |
| 2,477,898 | Rehman et al. | Aug. 2, 1949 |
| 2,550,001 | Button | Apr. 24, 1951 |

FOREIGN PATENTS

| Number | Country | Date |
|---|---|---|
| 37,308 | Sweden | July 29, 1914 |
| 679,090 | Germany | July 28, 1939 |